(12) United States Patent
Hanada

(10) Patent No.: US 8,286,933 B2
(45) Date of Patent: Oct. 16, 2012

(54) VALVE

(75) Inventor: Toshihiro Hanada, Nobeoka (JP)

(73) Assignee: Asahi Organic Chemicals Industry Co., Ltd., Nobeoka-Shi, Miyazaki (JP)

( * ) Notice: Subject to any disclaimer, the term of this patent is extended or adjusted under 35 U.S.C. 154(b) by 723 days.

(21) Appl. No.: 10/583,145

(22) PCT Filed: Dec. 15, 2004

(86) PCT No.: PCT/JP2004/019151
§ 371 (c)(1),
(2), (4) Date: Jun. 16, 2006

(87) PCT Pub. No.: WO2005/059414
PCT Pub. Date: Jun. 30, 2005

(65) Prior Publication Data
US 2007/0181835 A1    Aug. 9, 2007

(30) Foreign Application Priority Data

Dec. 17, 2003    (JP) .................................. 2003-419501

(51) Int. Cl.
*F16K 7/04*    (2006.01)
(52) U.S. Cl. .................................. 251/6; 251/5; 251/229
(58) Field of Classification Search .................. 604/33, 604/34; 251/4, 5, 6, 58, 56, 62, 229, 9
See application file for complete search history.

(56) References Cited

U.S. PATENT DOCUMENTS

| | | | | |
|---|---|---|---|---|
| 3,511,468 A | * | 5/1970 | Young | 251/6 |
| 3,550,861 A | * | 12/1970 | Teson | 239/546 |
| 3,830,462 A | * | 8/1974 | Henfrey | 251/5 |
| 4,372,345 A | * | 2/1983 | Mehus | 137/636 |
| 4,403,764 A | * | 9/1983 | Repplinger | 251/5 |
| 5,346,173 A | * | 9/1994 | Rasmusson | 251/58 |
| 6,000,629 A | | 12/1999 | Tamura et al. | |
| 6,536,739 B1 | * | 3/2003 | Jensen | 251/6 |
| 6,638,269 B2 | | 10/2003 | Wilcox | |

(Continued)

FOREIGN PATENT DOCUMENTS

DE    198 11 191 A1    10/1998

(Continued)

OTHER PUBLICATIONS

Supplementary European Search Report mailed Sep. 7, 2011 in corresponding European Patent Application No. 04807508.9.

(Continued)

*Primary Examiner* — John K Fristoe, Jr.
*Assistant Examiner* — Andrew J Rost
(74) *Attorney, Agent, or Firm* — Buchanan Ingersoll & Rooney PC

(57) ABSTRACT

A valve includes a valve body (1, 2), a tube (3) made of an elastomer extending through the inside of the valve body, and a roller (23) and a pressing surface (14) disposed facing each other across the tube (3). The roller (23) can be brought close to the pressing surface (14) to collapse the tube (3) between the roller (23) and pressing surface (14) and close the flow passage in the tube (3), and the roller (23) can be moved along the tube (3) to make a collapsed position where the tube (3) is collapsed by the roller (23) and the pressing surface (14) move along the flow passage axis of the tube (3) while maintaining the flow passage in the closed state.

3 Claims, 11 Drawing Sheets

U.S. PATENT DOCUMENTS

| | | |
|---|---|---|
| 2002/0043539 A1 | 4/2002 | Pagel et al. |
| 2003/0178504 A1 | 9/2003 | Fukano et al. |

FOREIGN PATENT DOCUMENTS

| | | |
|---|---|---|
| DE | 103 09 112 A1 | 10/2003 |
| GB | 2 324 133 A | 10/1998 |
| JP | 59/050277 | 3/1984 |
| JP | 7-51368 | 2/1995 |
| JP | 8-266623 | 10/1996 |
| JP | 9-250644 | 9/1997 |
| JP | 10-281318 | 10/1998 |
| JP | 2002-161901 | 6/2002 |
| JP | 2002-6549 | 9/2002 |
| JP | 2002-306549 | 10/2002 |
| JP | 2003-254459 A | 9/2003 |
| JP | 2003-278927 A | 10/2003 |
| TW | 461006 | 10/2001 |
| WO | WO 93/16308 | 8/1993 |

OTHER PUBLICATIONS

Taiwanese Official Action dated May 13, 2010 which issued in a related Taiwanese application.

* cited by examiner

VALVE

TECHNICAL FIELD

The present invention relates to an on/off valve and suck back valve used for example in a circuit for supplying chemicals or other liquids to a semiconductor wafer in a semiconductor production apparatus. More particularly, the present invention relates to a valve comprised of an on/off valve and suck back valve formed integrally—which is simple in flow passage shape, resistant to buildup of bubbles, and enables easy adjustment of the amount of suck back.

BACKGROUND ART

In the past, suck back valves have been used for the purpose of preventing fluid in piping from dripping down from the end of the piping after a flow passage in the piping have been closed. As the suck back valves, ones with mechanisms for causing displacement of diaphragms to change the volumes in the valves and suck back fluid and ones such as disclosed in Japanese Unexamined Patent Publication No. 2003-254459 which are provided at the upstream sides of the suck back valves with diaphragm type on/off valves, integral with the suck back valves, for stopping the flow of fluid are most general. In the operation of such a latter valve, the on/off valve arranged at the upstream side is at first closed, and the suck back valve is then operated. Further, as described in Japanese Unexamined Patent Publication No. 2003-278927, there is also a system which uses a diaphragm and simultaneously operates the on/off valve and suck back valve.

In a conventional suck back valve of a type integral with an on/off valve, the on/off valve and the suck back valve are individually controlled, so there were the problems that it was difficult to match the timing of closing the on/off valve and the timing of operating the suck back, the predetermined amount of suck back could not be obtained, and dripping of fluid occurred. Further, not only was adjustment of the timing troublesome, but even after adjustment once, if the air pressure for operating the valve fluctuated, the timings of the closing of the on/off valve and the suck back operation became off. Therefore, there was the problem that frequent adjustment became necessary. Further, in the case of applications for coating photoresist solutions in semiconductor production, since an on/off valve using a diaphragm has a structure in which bubbles easily build up in the valve chamber, there was the problem of the built up bubbles flowing out and spreading over the wafer to cause uneven coating and thereby lower the yield. There was a similar problem even with a suck back valve using a diaphragm.

DISCLOSURE OF THE INVENTION

An object of the present invention is to solve this problem of the prior art and to provide a valve having a structure not requiring adjusting of the timings of the closing of the flow passage and the suck back operation, having a simple flow passage, and resistant to buildup of bubbles.

The valve according to the present invention is a valve which includes a valve body and a tube made of an elastomer extending through the inside of the valve body, and for closing off the flow of fluid in the tube, the valve characterized by further including squeezing means disposed facing each other across the tube, the squeezing means being adapted so that the squeezing means can be brought close together to collapse the tube and close the flow passage inside the tube and so that at least one of the squeezing means can be moved along the tube so as to move a collapsed position where the tube is collapsed by the squeezing means while maintaining the flow passage in the closed state.

Preferably, in the valve, the squeezing means includes a movable roller and a pressing surface formed on the valve body, part of the tube is arranged along the pressing surface, and the roller moves to a position facing the pressing surface to collapse the tube and then moves parallel to the pressing surface.

Preferably, the roller is supported by a rotating member rotating with respect to the valve body about an axis of rotation, and the pressing surface is an arc-shaped surface formed on the valve body and extending about the axis of rotation. In this case, for example, a cylinder chamber accommodating the piston is formed in the valve body, and the piston is driven in the axial direction of the cylinder chamber by the working fluid so that the rotating member rotates about the axis of rotation linked with the piston.

Preferably, a spring is provided in the cylinder chamber and the piston is urged by the spring toward one end of the cylinder chamber in the axial direction.

Also, preferably, the piston is positioned by the spring at a neutral position where the roller supported by the rotating member linked with the piston collapses the tube together with the pressing surface to close the flow passage in the tube, and, when opening the flow passage in the tube and when making the roller move along the flow passage axis of the tube while collapsing the tube with the pressing surface, pressure of a working fluid is utilized to make the piston move from the valve fully closed position and the neutral position.

In a preferable embodiment, the rotating member further includes an engagement shaft part positioned at an opposite side from the roller across the axis of rotation of the rotating member and extending parallel to the axis of rotation, the piston is formed with a notch extending in a direction vertical to the direction of movement of the piston, and the engagement shaft part engages with the notch and the engagement shaft part rotates about the axis of rotation of the rotating member along with movement of the piston so as to make the rotating member rotate about the axis of rotation.

In another preferred embodiment, the rotating member has a cylindrical surface, a rack is provided on a side surface of the piston, a gear engaging with the rack is provided on the cylindrical surface of the rotating member, and the rotating member rotates about the axis of rotation along with movement of the piston.

The rotating member may be driven by an electric motor. The electric motor is preferably a stepping motor.

Preferably, a cylinder chamber extending parallel to the tube is formed in the valve body, and the squeezing means includes a roller provided at a front end of a projecting part extending from a piston accommodated in the cylinder chamber in a direction vertical to an axis of movement of the piston and the pressing surface formed on the valve body. The pressing surface more preferably has a stepped surface.

The valve according to the present invention includes the squeezing means, and the collapsed position where the tube is collapsed by the squeezing means can be moved along the flow passage axis of the tube. Therefore, the flow passage inside the tube can be closed off and a suck back operation can be performed by a single series of operation, the timings of the closing of the flow passage and the suck back operation do not have to be adjusted, and the timings will not become off after setting the valve. Further, the flow passage has a tubular shape, the flow of fluid is smooth, and there is resistance to buildup of bubbles. Therefore, deterioration of the yield in the photoresist coating step in semiconductor production caused by bubbles can be reduced.

BRIEF DESCRIPTION OF THE DRAWINGS

The above and other objects, features, and advantages of the present invention will be described below in more detail based on the embodiments of the present invention with reference to the accompanying drawings, wherein.

BEST MODE FOR CARRYING OUT THE INVENTION

While embodiments of the present invention will be described below with reference to the drawings, the present invention should not, of course, be limited to thereto.

A first embodiment of the present invention is shown in FIGS. 1 to 7.

Figure 1:
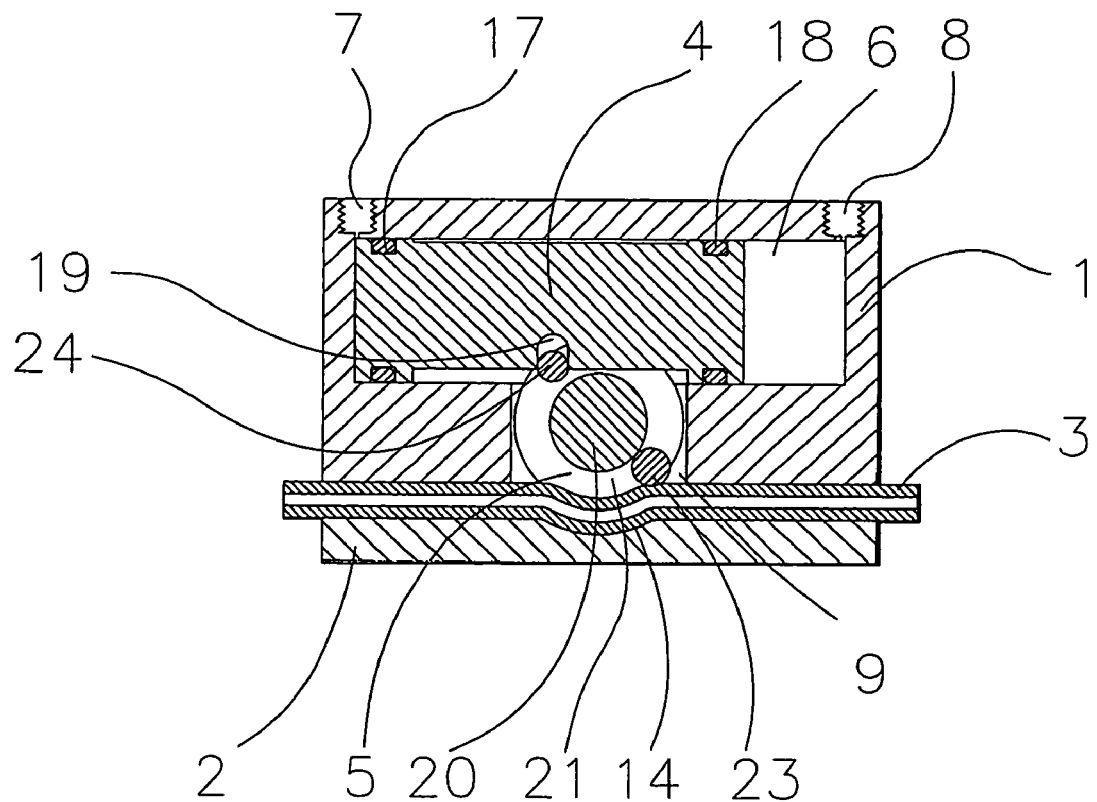
FIG. 1 is a longitudinal cross-sectional view showing an open state of a valve according to a first embodiment of the present invention.
Figure 2:
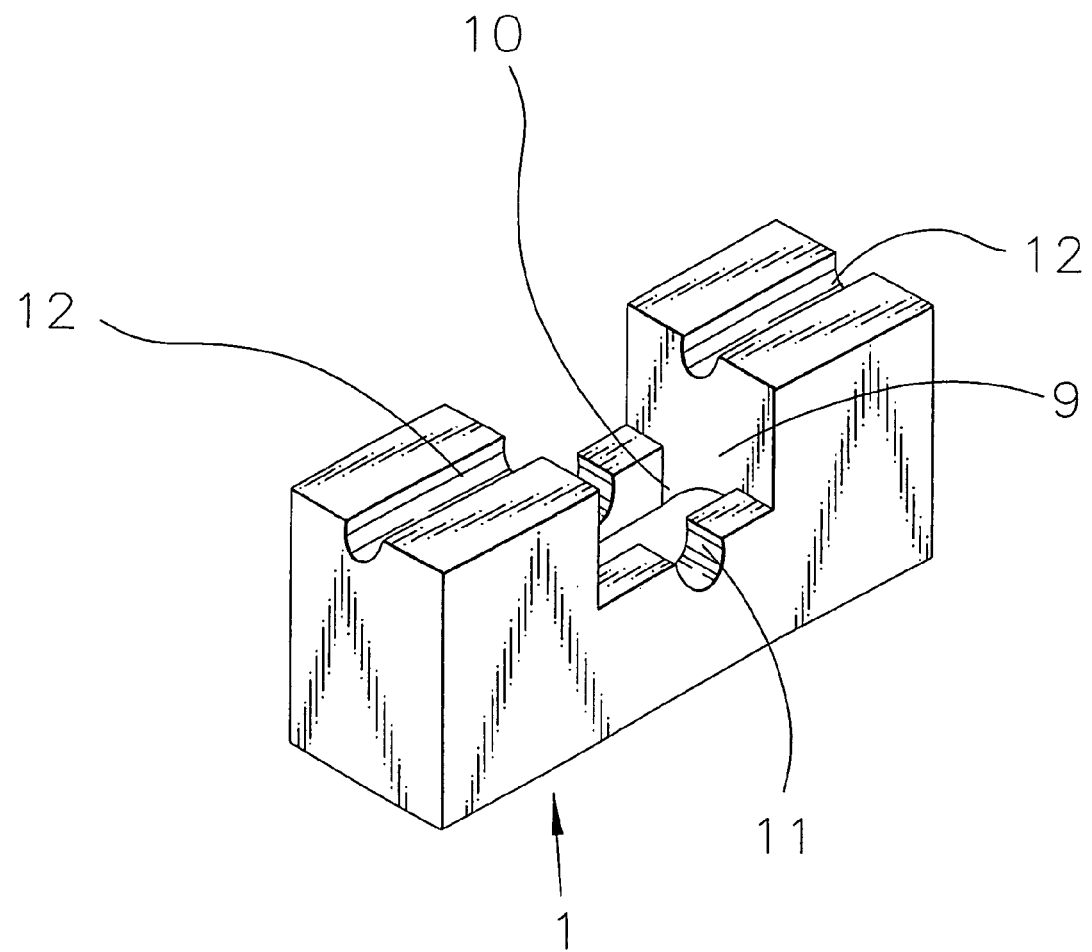
FIG. 2 is a perspective view of an upper valve housing of the valve of FIG. 1 as seen from the bottom direction.
Figure 3:
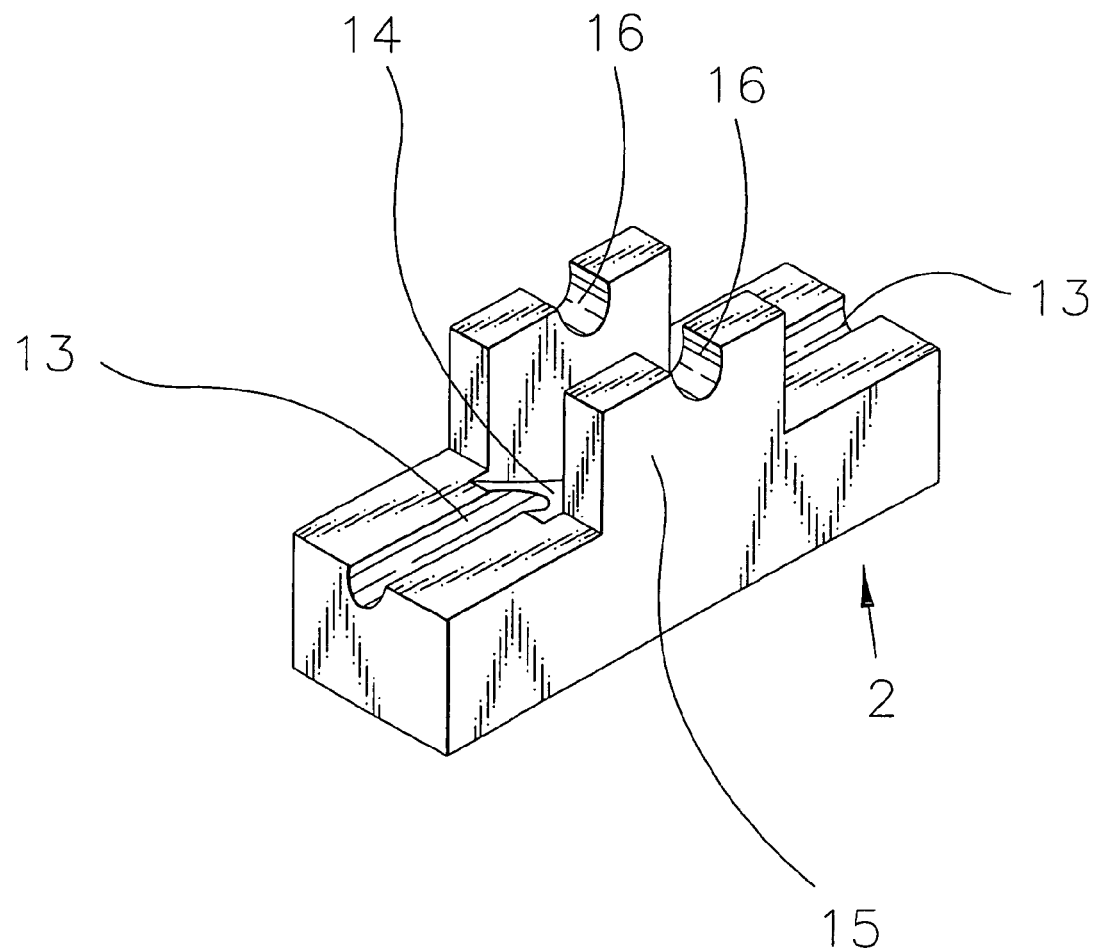
FIG. 3 is a perspective view of a lower valve housing of the valve of FIG. 1.
Figure 4:
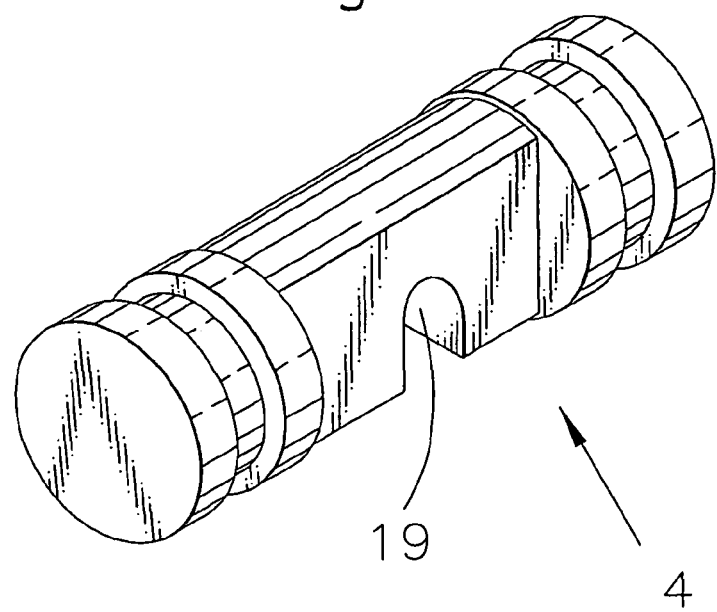
FIG. 4 is a perspective view of a piston of the valve of FIG. 1.
Figure 5:
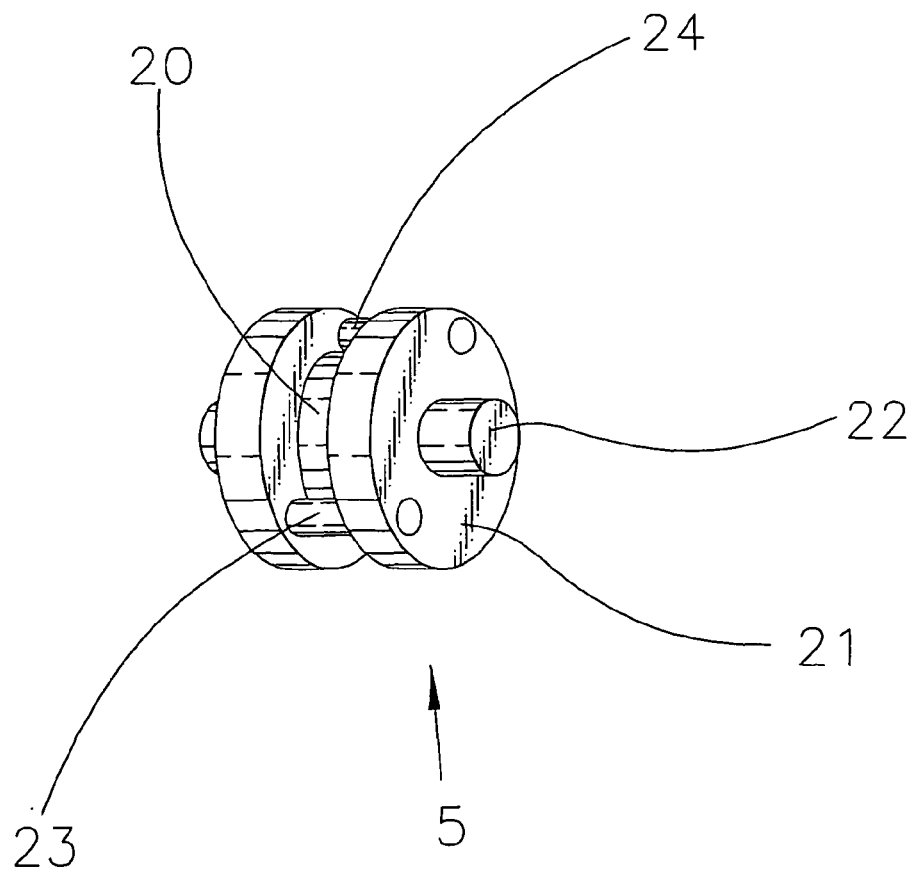
FIG. 5 is a perspective view of a rotor of the valve of FIG. 1.
Figure 6:
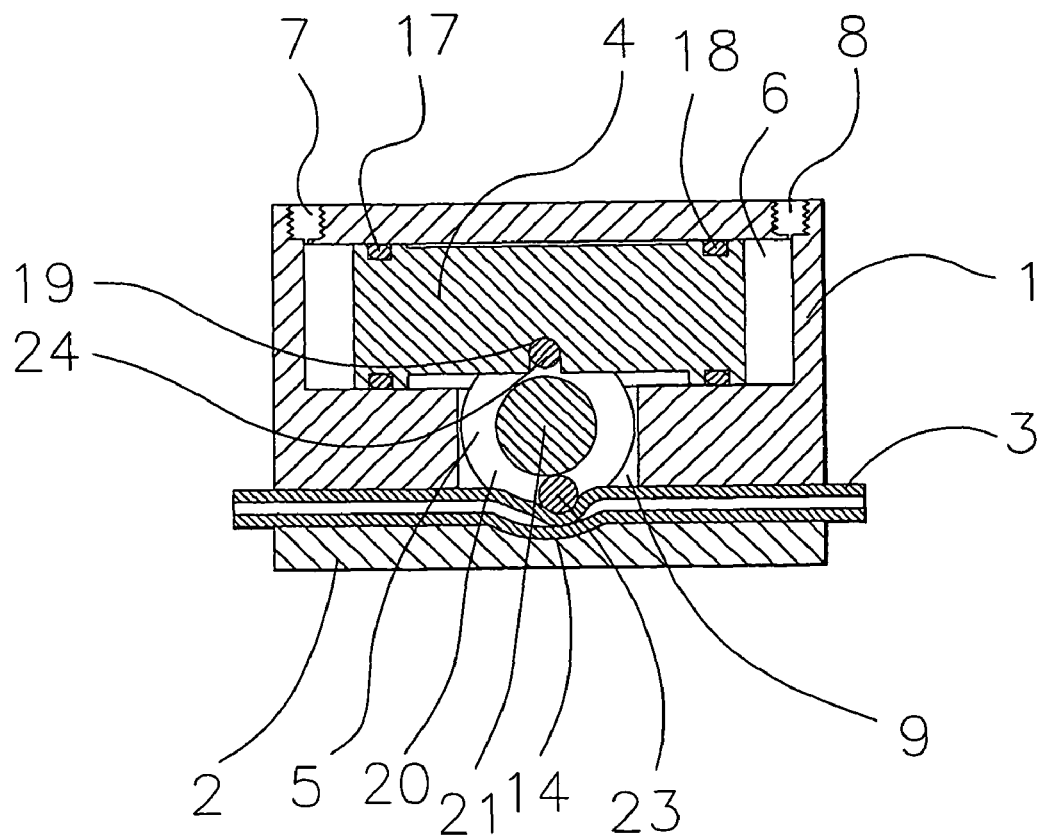
FIG. 6 is a longitudinal cross-sectional view showing a closed state of the valve of FIG. 1.
Figure 7:
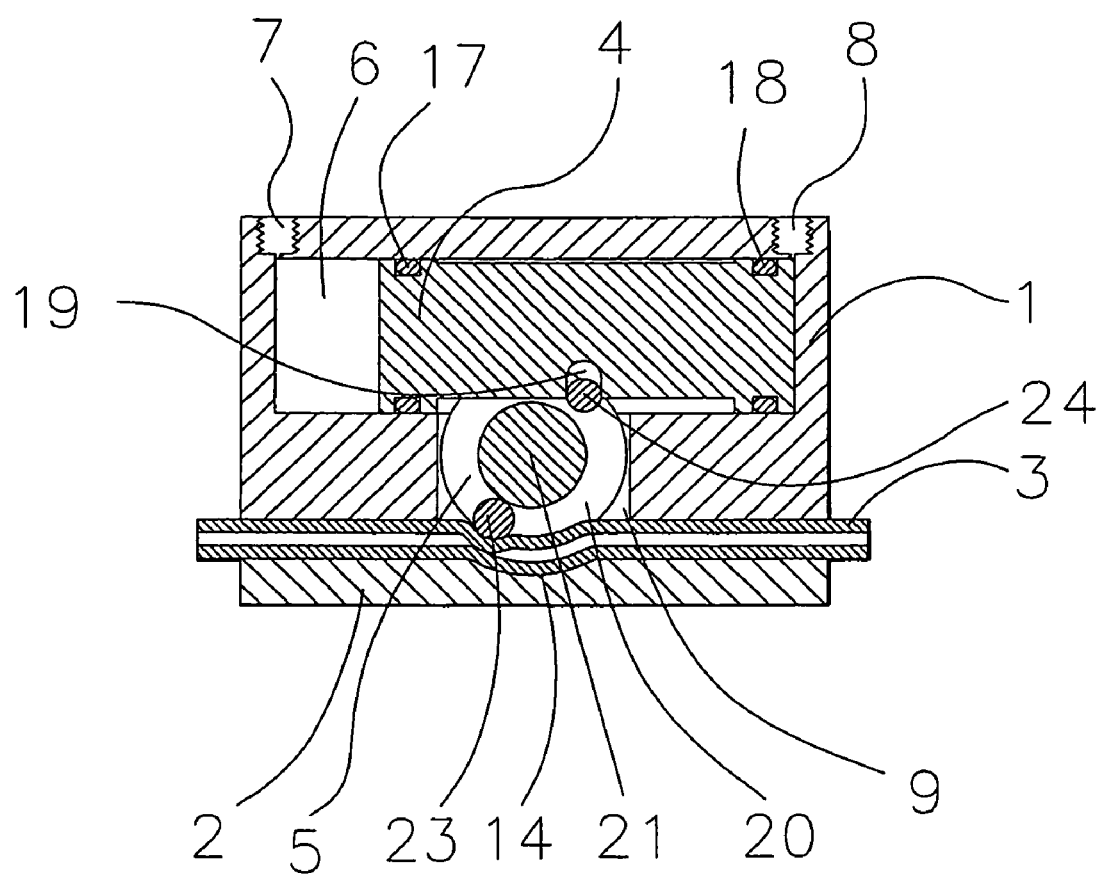
FIG. 7 is a longitudinal cross-sectional view showing a state where the valve of FIG. 1 performs a suck back operation.

In FIG. 1, reference numeral "1" indicates an upper valve housing, which has, inside it, a cylinder chamber 6 and a pair of working fluid supply ports 7 and 8 communicating with the cylinder chamber 6. The upper valve housing 1 is formed at the bottom center thereof with a recess 9 having a rectangular cross-section. The recess 9 is formed at the top surface thereof with a rectangular opening 10 communicating with the cylinder chamber 6. The two outer sides of the top surface of the recess 9 in the direction vertical to the axial direction are formed with groove bearing parts 11 each having a semicircular cross-section. Further, the upper valve housing 1 is provided, at the two sides of the recess 9 in the axial direction on the bottom surface thereof, with grooves 12 each having a semicircular cross-section and extending parallel to the axial direction of the cylinder chamber 6 (see FIG. 2).

Reference numeral "2" indicates a lower valve housing, which has an approximate inverted T-shape. The lower valve housing 2 is provided at the two side parts of the top surface thereof with semicircular cross-sectional shape grooves 13 for mating with the grooves 12 of the upper valve housing 1. The grooves 13, together with the grooves 12 of the upper valve housing 1, hold and fasten an elastomer tube 3 forming a fluid flow passage inside it. At the center of the grooves 13, a pressing surface 14 is formed extending in a direction vertical to the tube 3 and sunk down in an arc cross-sectional shape in a direction parallel to the tube 3. Further, the two sides of the pressing surface 14 in a direction vertical to the axial direction of the grooves 13 are provided with a pair of projecting parts 15 for engaging with the recess 9 of the upper valve housing 1. Each of the projecting parts 15 is formed at the center of the top thereof with semicircular cross-sectional shape bearing part 16 for mating with each of the bearing parts 11 of the upper valve housing 1 so as to become substantially coaxial with the pressing surface 14 (see FIG. 3). The upper valve housing 1 and the lower valve housing 2 are fit together to form a valve body through which a tube 3 passes.

Reference numeral "4" indicates a cylindrical piston. The piston 4 has grooves at the two ends thereof in which O-rings 17 and 18 are fit and is slidably inserted in the cylinder chamber 6 of the upper valve housing 1. The center part of the piston 4 exposed from the opening 10 of the upper valve housing 1 is formed with a groove-shaped notch 19 extending in a direction vertical to the axial direction of the cylinder chamber 6 (see FIG. 4).

Reference numeral "5" indicates a rotor functioning as a rotating member. The rotor 5 is formed with a cylindrical part 20 at the center thereof. At the two sides of the cylindrical part 20, disk parts 21 and shaft parts 22 are consecutively formed. The shaft parts 22 are supported by the bearing parts 11 of the upper valve housing 1 and the bearing parts 16 of the lower valve housing 2 so as to be rotatable. The disk parts 21 are provided with two rollers 23 and 24, which orbit about the axis of rotation of the rotor 5 due to rotation of the rotor 5, rotatably at substantially facing positions across the axis of rotation of the rotor 5. One roller 23 functions as a squeezing means for pressing the tube 3 against the pressing surface 14 of the lower valve housing 2 along with rotation of the rotor 5, while the other roller 24 functions as an engaging shaft part for engaging with the notch 19 of the piston 4 (see FIG. 5).

The method of connecting the tube 3 and an outside pipe is not particularly limited.

Next, the operation of the valve of the present embodiment configured in this way will be described.

FIG. 1 shows an open state of the valve. It should be noted that fluid flows through the tube 3 from the left side in the figure to the right side. When working fluid (for example, compressed air) is fed from the outside through a working fluid supply port 7 provided at the upper valve housing 1 to the cylinder chamber 6, the pressure of the working fluid causes the piston 4 to move to the right side. At this time, the roller 24 engaged with the notch 19 also similarly moves in the notch 19 in the vertical direction while moving to the right side. Simultaneously, the rotor 5 where the roller 24 is provided rotates clockwise, so that the other roller 23 presses and collapses the tube 3 with the pressing surface 14 of the lower valve housing 2 whereby the fluid flow in the tube 3 is closed off (state of FIG. 6).

When the piston 4 further moves to the right side, the rotor 5 rotates clockwise along with this and the collapsed position where the tube 3 is collapsed by the roller 23 moves to the left side while maintaining fluid flow in the closed-off state. At this time, the volume of the inside of the tube 3 at the downstream side from the collapsed position increases over the volume of the inside of the tube 3 at the downstream side from the collapsed position at the instant where the fluid flow was first closed off (state of FIG. 7). Due to this, a suck back operation where fluid at the downstream side is sucked back is performed.

On the other hand, when working fluid is supplied through the working fluid supply port 8 to the cylinder chamber 6, the piston 4 moves to the left side. Along with that, the rotor 5 rotates counterclockwise and the valve becomes the open state (state of FIG. 1).

Figure 8:
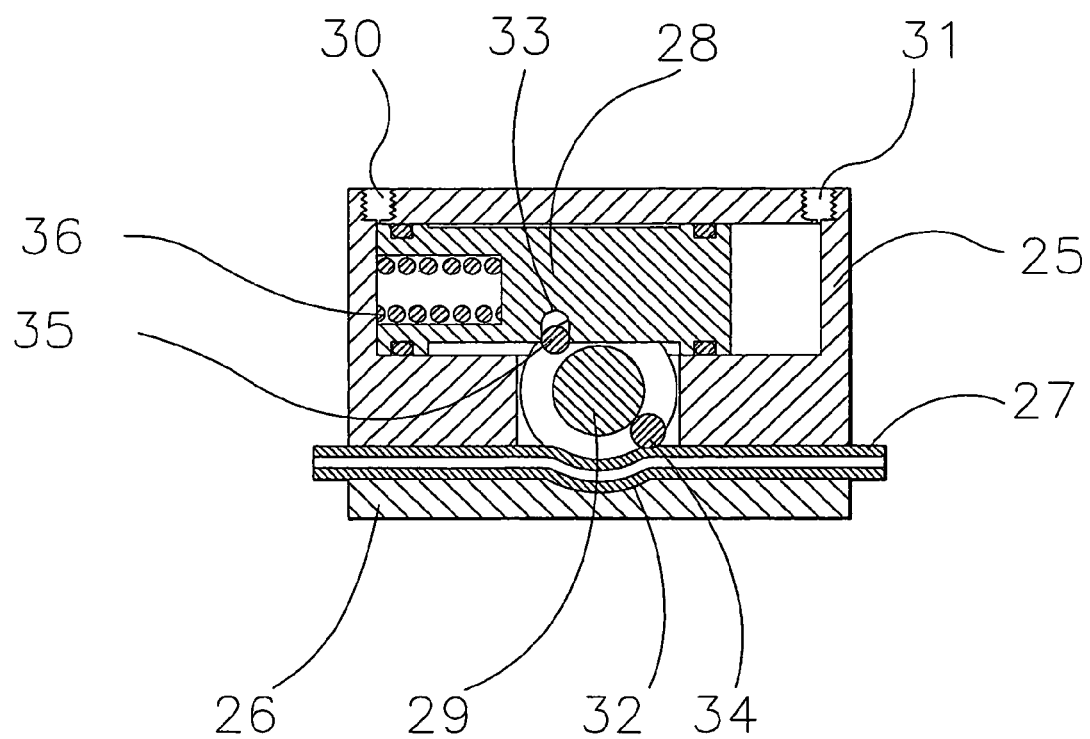
FIG. 8 is a longitudinal cross-sectional view of a valve according to a second embodiment of the present invention.

FIG. 8 shows a second embodiment of the valve of the present invention.

The structures of the upper valve housing 25, the lower valve housing 26, and the rotor 29 in the second embodiment are similar to the structures of the upper valve housing 1, lower valve housing 2, and rotor 5 of the first embodiment except that a spring 36 is accommodated in a recess formed on one end face of a piston 28 in the axial direction thereof and the piston 28 is urged by the spring 36 in the right direction, that is, the valve closing direction.

In FIG. 8, the piston 28 is moved in the left direction, that is, the valve opening direction, by the compressed air introduced from the working fluid supply port 31. At this time, the spring 36 arranged at the left side of the piston 28 is compressed.

When the compressed air is released through the working fluid supply port 31 from this state, the piston 28 is moved in the right direction by the urging force of the spring 38. At this time, the roller 35 functioning as the engaging shaft part engaged with the notch 33 moves inside the notch 33 in the vertical direction while similarly moving to the right side. Simultaneously, the rotor 29 where the roller 35 is provided rotates clockwise. Therefore, the other roller 34 presses and collapses the tube 27 with the pressing surface 32 of the lower valve housing 26 to close off fluid flow inside the tube 27.

Figure 9:
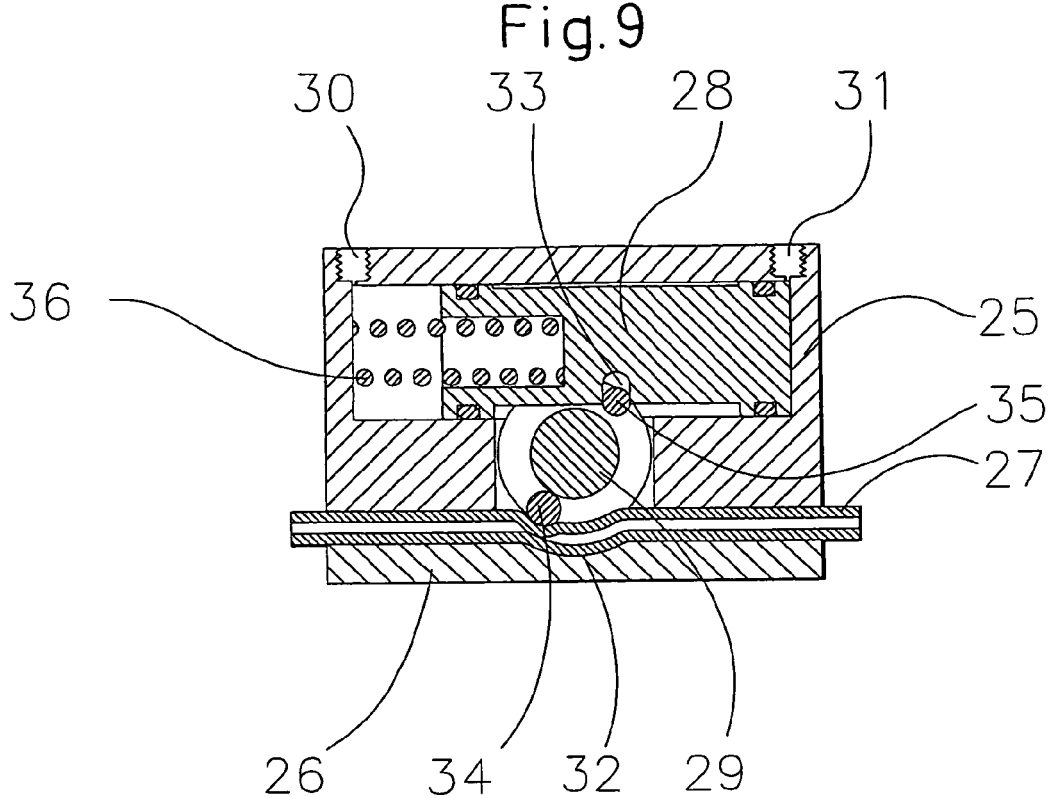
FIG. 9 is a longitudinal cross-sectional view showing a state where the valve of FIG. 8 performs a suck back operation.

When the piston 28 is further moved to the right side by the urging force of the spring 36, the rotor 29 rotates clockwise along with that and the collapsed position where the tube 27 is collapsed moves to the left side while maintaining the fluid flow in the closed-off state. The volume of the inside of the tube 27 at the downstream side from the collapsed position increases over the volume of the inside of the tube 27 at the downstream side from the collapsed position at the instant where the fluid flow was first closed off (state of FIG. 9). Due to this, a suck back operation where fluid at the downstream side is sucked back is performed.

In the present embodiment, it is also possible to have the piston 28 operated by just the urging force of the spring 36 from the fully open state of the valve to the fully closed state (that is, from the state where the tube 27 is not collapsed between the roller 34 and the pressing surface 32 to the state where the roller 34 moves to a position facing the pressing surface 32 and the tube 27 is collapsed between the roller 34 and the pressing surface 32) and have the subsequent suck back operation (that is, the operation of the roller 34 being made to move along the tube 27 and pressing surface 32 while maintaining the state of the roller 34 and pressing surface 32 collapsing the tube 27 and closing off the flow passage) performed by the force of compressed air introduced through the working fluid supply port 30.

By having at least the operation of the valve shifting from the fully open state to the fully closed state be performed by the urging force of the spring in this way, if some sort of trouble causes the supply of working fluid to be stopped, the valve will automatically fully close and therefore the outflow of chemicals can be prevented.

Figure 10:
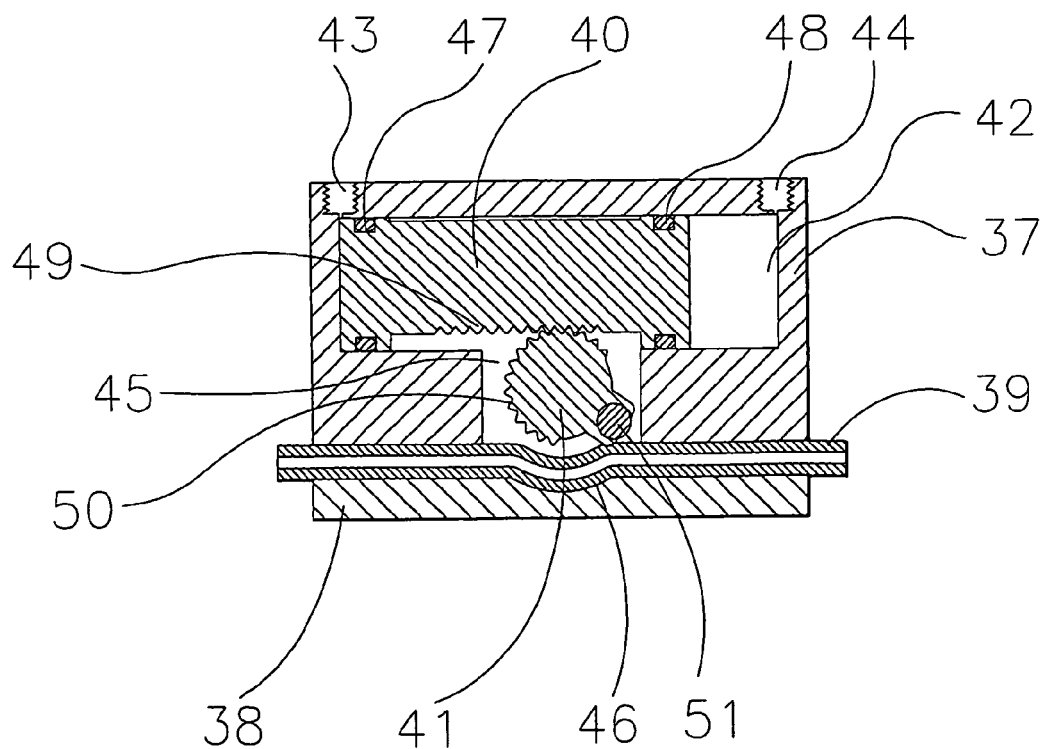
FIG. 10 is a longitudinal cross-sectional view showing an open state of a valve according to a third embodiment of the present invention.

FIG. 10 shows a third embodiment of the valve of the present invention.

The structures of the upper valve housing 37 and lower valve housing 38 in FIG. 10 are similar to the structures of the upper valve housing 1 and lower valve housing 2 in the first embodiment and, therefore, their explanations will be omitted.

Reference numeral "40" indicates a cylindrical piston. The piston 40 has grooves at two ends thereof in which O-rings 47 and 48 are fit and is slidably inserted in a cylinder chamber 42 of the upper valve housing 37. The bottom surface of the center part of the piston 40 exposed from the opening 45 of the upper valve housing 37 is provided with a rack 49.

Reference numeral "41" indicates a rotor having a substantially circular cross-section and formed with a projection at one part. The rotor 41 is formed at the outer circumferential surface of the top substantially circular cross-sectional shape part thereof with a gear part 50 for engaging with the rack 49 of the piston 40. The rotor 41 is further provided at the bottom projection part thereof with a roller 51, which orbits about the axis of rotation of the rotor 41 along with rotation of the rotor 41 and is adapted to be rotatable. The roller 51 functions as the squeezing means for pressing the tube 39 against the pressing surface 46 of the lower valve housing 38 along with rotation of the rotor 41. The rotor 41 is further provided at the two sides thereof with shaft parts which are supported by the bearing parts of the upper valve housing 37 and the bearing parts of the lower valve housing 38 so as to be rotatable (not shown).

Next, the operation of the valve of the present embodiment configured in this way will be described.

FIG. 10 shows an open state of the valve. It should be noted that fluid flows through the tube 39 from the left side in the figure to the right side. When working fluid (for example, compressed air) is fed from the outside through a working fluid supply port 43 provided at the upper valve housing 37 to the cylinder chamber 42, the pressure of the working fluid causes the piston 40 to move to the right side. At this time, the roller 41 engaged with the rack 49 at its gear part 50 rotates clockwise, so that the roller 51 presses and collapses the tube 39 with the pressing surface 46 of the lower valve housing 38 whereby fluid flow in the tube 39 is closed off. When the piston 40 further moves to the right side, the rotor 41 rotates clockwise along with this and the collapsed position where the tube 39 is collapsed by the roller 51 moves to the left side while maintaining the fluid flow in the closed-off state. The volume of the inside of the tube 39 at the downstream side from the collapsed position increases over the volume of the inside of the tube 39 at the downstream side from the collapsed position at the instant where the fluid flow was first closed off. Due to this, a suck back operation where fluid at the downstream side is sucked back is performed.

On the other hand, when working fluid is supplied through the working fluid supply port 44 to the cylinder chamber 42, the piston 40 moves to the left side. Along with that, the rotor 41 rotates counterclockwise and the valve becomes the open state (state of FIG. 10).

Figure 11:
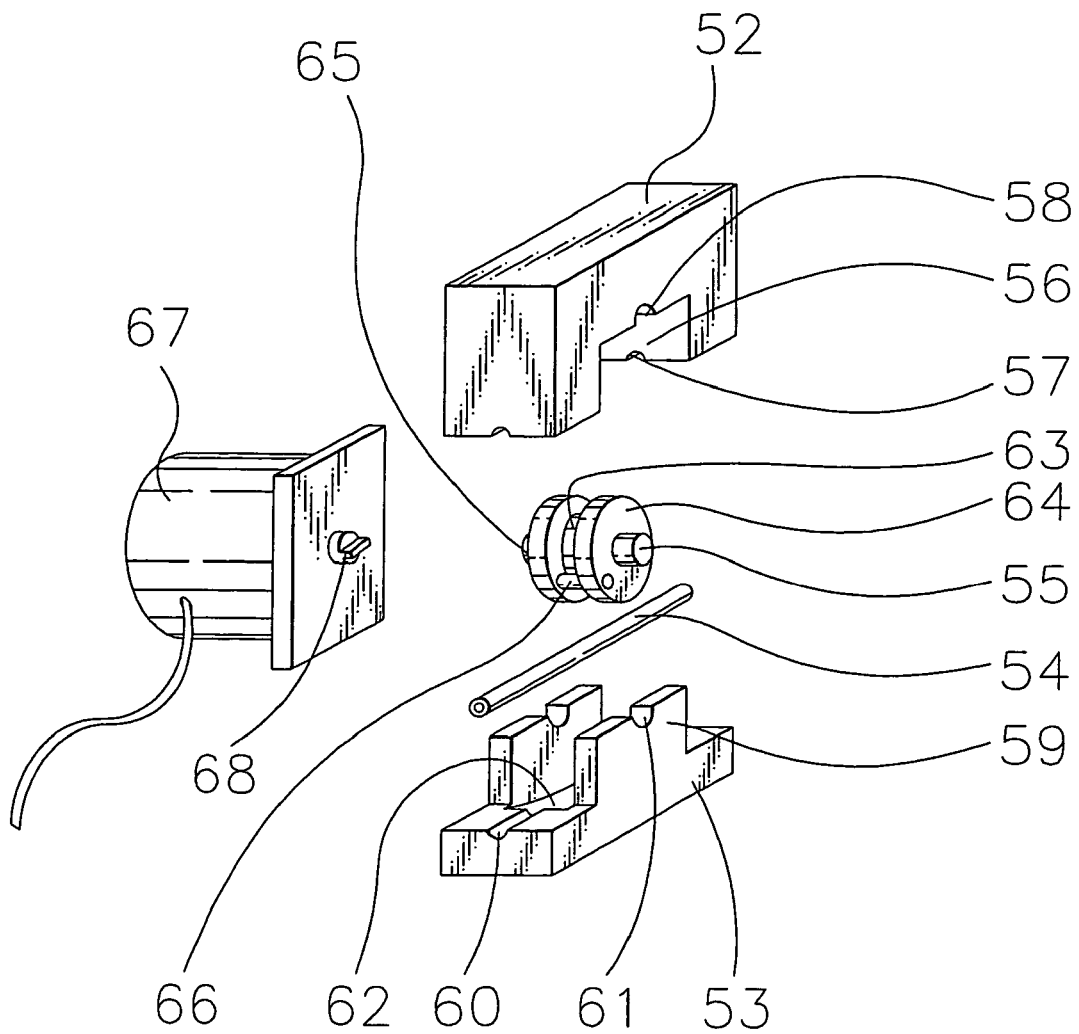
FIG. 11 is a disassembled perspective view of a valve according to a fourth embodiment of the present invention.

FIG. 11 shows a fourth embodiment of the valve of the present invention.

In FIG. 11, reference numeral "52" indicates an upper valve housing. The upper valve housing 52 is formed at its bottom with a recess 56 having a rectangular cross-section. The recess 56 is formed at the top surface thereof with a rectangular opening (not shown) in which a rotor 55 is accommodated and a bearing part 58 having a semicircular cross-section and extending in a direction vertical to the direction of fluid flow. Further, the bottom surface of the upper valve housing 52 is provided at the centers of the two sides of the recess 56 in the flow direction with semicircular cross-sectional shape grooves 57 for holding tubes parallel to the flow direction of the fluid.

The structure of the lower valve housing 53 is similar to the structure of the lower valve housing 2 of the first embodiment and, therefore, its explanation will be omitted.

Reference numeral "55" indicates a rotor. The rotor 55 is formed with a cylindrical part 63 at the center thereof. At the two ends of the cylindrical part 63, disk parts 64 and shaft parts 65 are consecutively formed. The shaft parts 65 are supported by the bearing part 58 of the upper valve housing 52 and the bearing parts 61 of the lower valve housing 53 so as to be rotatable. One of the shaft parts 65 is coupled to a front end of a shaft 68 of a later described stepping motor 67. At the outer circumferences of the disk parts 64, a roller 66 orbiting about the axis of rotation of the rotor 55 along with rotation of the rotor 55 is supported so as to be rotatable. The roller 66 functions as a squeezing means for pressing the tube 54 against the pressing surface 62 of the lower valve housing 53 along with rotation of the rotor 55.

Reference numeral "67" indicates a stepping motor. The front end of the shaft 68 of the stepping motor 67 is fixedly coupled to the shaft part 65 of the rotor 55 so that the rotor 55 can rotate along with operation of the stepping motor 67.

The operation of the valve of this embodiment is similar to that of the first embodiment and, therefore, a detailed explanation will be omitted. It should be noted that the rotation of the rotor 55 is controlled by the stepping motor 67 and, therefore, the speed of the suck back operation and the amount of suck back can be easily adjusted.

Figure 12:
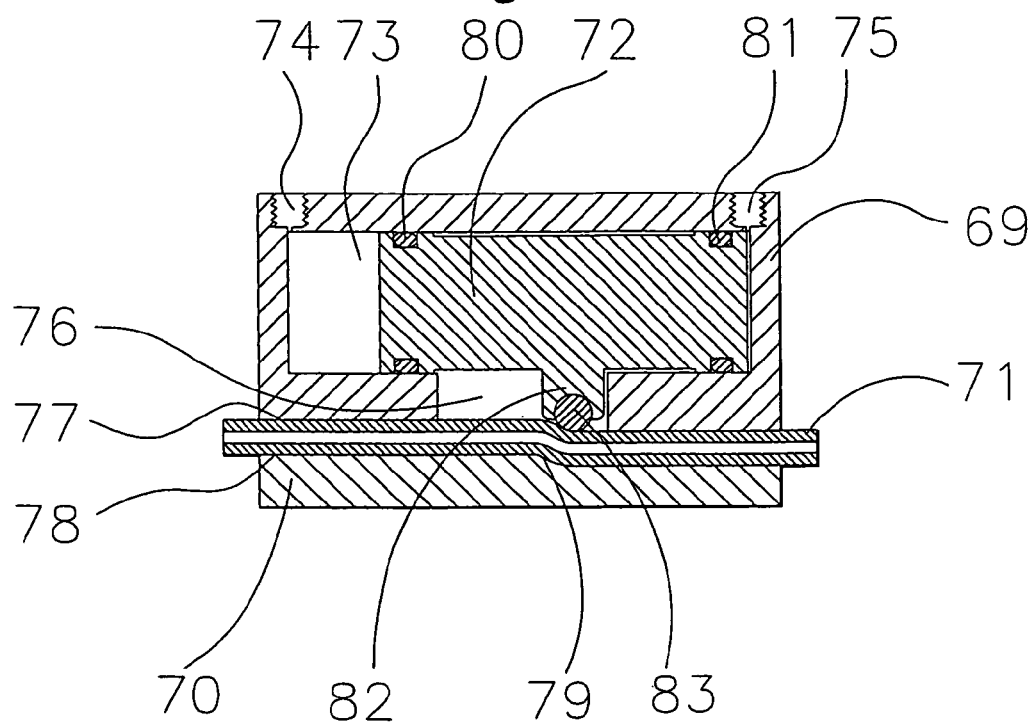
FIG. 12 is a longitudinal cross-sectional view showing an open state of a valve according to a fifth embodiment of the present invention.

FIG. 12 shows a fifth embodiment of a valve of the present invention.

In FIG. 12, reference numeral "69" indicates an upper valve housing, which has, inside it, a cylinder chamber 73 and a pair of working fluid supply ports 74 and 75 communicating with the cylinder chamber 73. The upper valve housing 69 is formed at the bottom center thereof with a rectangular cross-sectional shape opening 76 communicating with the cylinder chamber 73. The bottom of the upper valve housing 69 is provided, at the centers of the two sides of the opening part 76 in the axial direction, with semicircular cross-sectional shape grooves 77 extending parallel to the axial direction of the cylinder chamber 73.

Reference numeral "70" indicates a lower valve housing, which has an approximate inverted T-shape. The lower valve housing 70 is provided at the two side parts of the top surface thereof with semicircular cross-sectional shape grooves 78 for mating with the grooves 77 of the upper valve housing 69. The grooves 78, together with the grooves 77 of the upper valve housing 69, hold and fasten an elastomer tube 71 forming a fluid flow passage inside it. The lower valve housing 70 is provided at the top surface thereof with a step difference. The upper level forms a pressing surface 79.

Reference numeral "72" indicates a cylindrical piston. The piston 72 has grooves at the two ends thereof in which O-rings 80 and 81 are fit and is slidably inserted in the cylinder chamber 73 of the upper valve housing 69. At the center part of the piston 72, a projecting part 82 is provided so as to project out from the opening 76 of the upper valve housing 69 in a direction vertical to the axial direction of the cylinder chamber 73. At the front end of the projecting part 82, a roller 83 perpendicular to the tube 71 is disposed so as to be rotatable.

The operation of the valve of the present embodiment configured as described above will be described below.

Figure 13:
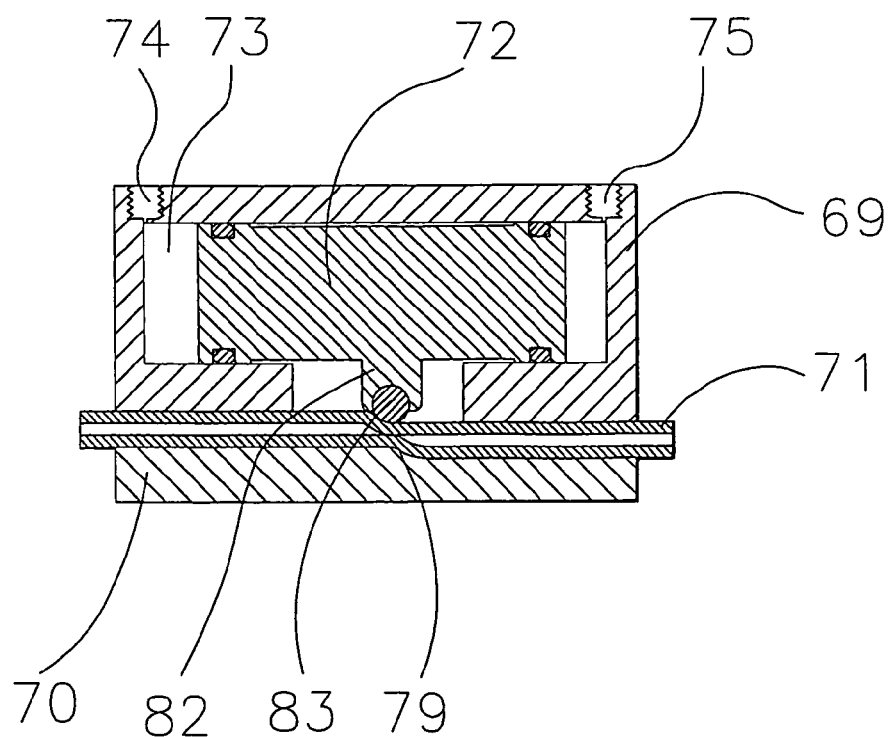
FIG. 13 is a longitudinal cross-sectional view showing a closed state of a valve of FIG. 12.

FIG. 12 shows an open state of the valve. It should be noted that fluid flows through the tube 71 from the left side in the figure toward the right side. When working fluid (for example compressed air) is fed from the outside through the working fluid supply port 75 provided at the upper valve housing 69 to the cylinder chamber 73, pressure of the working fluid causes the piston 72 to move to the left side. At this time, the roller 83 at the front end of the projecting part 82 moves to the left side, so that it presses and collapses the tube 71 with the pressing surface 79 to close off the fluid flow in the tube 71 (state of FIG. 13).

Figure 14:
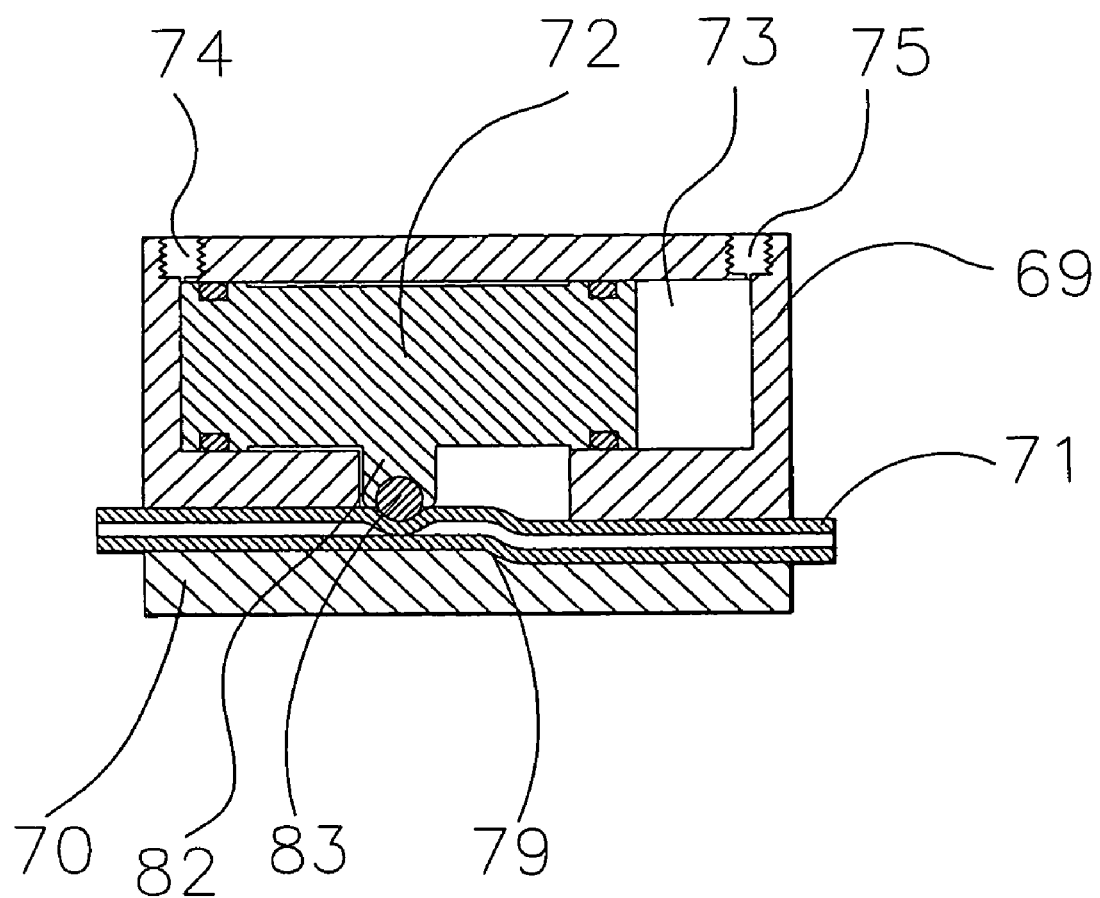
FIG. 14 is a longitudinal cross-sectional view showing a state where the valve of FIG. 12 performs a suck back operation.

When the piston 72 further moves to the left side, the collapsed position where the tube 71 is collapsed by the roller 83 moves to the left side while maintaining the fluid flow in the closed-off state. At this time, the volume of the inside of the tube 71 at the downstream side from the collapsed position increases over the volume of the inside of the tube 71 at the downstream side from the collapsed position at the instant where the fluid flow was first closed off (state of FIG. 14). Due to this, a suck back operation where fluid at the downstream side is sucked back is performed.

On the other hand, when working fluid is supplied through the working fluid supply port 74 to the cylinder chamber 73, the piston 72 moves to the right side. Along with that, the roller 83 moves to a position where the tube 71 is not collapsed, and the valve becomes an open state (state of FIG. 12).

Although the several embodiments of the present invention shown in the accompanying drawings have been described above, these embodiments are only illustrative but not limitative. Therefore, the scope of the present invention is defined by the appended claims and the embodiments of the present invention can be modified or changed without departing from the scope of the claims.

LIST OF REFERENCE CHARACTERS

1 Upper valve housing
2 Lower valve housing
3 Tube
4 Piston
5 Rotor
6 Cylinder chamber
7 Working fluid supply port
8 Working fluid supply port
9 Recess
10 Opening
11 Bearing part
12 Groove
13 Groove
14 Pressing surface
15 Projecting part
16 Bearing part
17 O-ring
18 O-ring
19 Notch
20 Cylindrical part
21 Disk part
22 Shaft part
23 Roller
24 Roller
25 Upper valve housing
26 Lower valve housing
27 Tube
28 Piston
29 Rotor 30 Working fluid supply port
31 Working fluid supply port
32 Pressing surface
33 Notch
34 Roller
35 Roller
36 Spring
37 Upper valve housing
38 Lower valve housing
39 Tube
40 Piston
41 Rotor
42 Cylinder chamber
43 Working fluid supply port
44 Working fluid supply port
45 Opening
46 Pressing surface
47 O-ring
48 O-ring
49 Rack
50 Gear
51 Roller
52 Upper valve housing
53 Lower valve housing
54 Tube
55 Rotor
56 Recess
57 Groove
58 Bearing part
59 Projecting part
60 Groove
61 Bearing part
62 Pressing surface
63 Cylindrical part
64 Disk part
65 Shaft part
66 Roller
67 Stepping motor
68 Shaft part
69 Upper valve housing
70 Lower valve housing
71 Tube
72 Piston
73 Cylinder chamber
74 Working fluid supply port
75 Working fluid supply port
76 Opening
77 Groove
78 Groove
79 Pressing surface
80 O-ring
81 O-ring
82 Projecting part
83 Roller

The invention claimed is:

1. A valve, comprising a valve body and a tube made of an elastomer extending through the inside of said valve body, said tube providing a flow passage having a flow passage axis, and for closing off the flow of fluid in said tube,
said valve characterized by further comprising squeezing means disposed facing each other across said tube, and a rotating member supported by said valve body so as to be rotatable about an axis of rotation, said squeezing means comprising a roller rotatably supported by said rotating member so that said roller orbits about the axis of rotation of said rotating member along with rotation of said rotating member, and an arc-shaped pressing surface formed on said valve body and extending to be centered around said axis of rotation of said rotating member, part of said tube arranged along said pressing surface, wherein rotation of said rotating member makes said roller move to a position facing said pressing surface to collapse said tube and close the flow passage inside said tube and then makes said roller move parallel to said pressing surface so as to move a collapsed position where said tube is collapsed by said roller while maintaining said flow passage in the closed state,
wherein a cylinder chamber accommodating a piston is formed in said valve body, said piston adapted to be driven in an axial direction of said cylinder chamber by a working fluid, said piston provided with a notch extending in a direction vertical to a direction of movement of said piston;
wherein said rotating member further comprises an engagement shaft part positioned at a side opposite to said roller across said axis of rotation of said rotating member and extending parallel to said axis of rotation, said engagement shaft part engaging with said notch of said piston adapted to rotate about said axis of rotation of said rotating member along with the movement of said piston so as to make said rotating member rotate about said axis of rotation.

2. The valve according to claim 1, wherein a spring is provided in said cylinder chamber and said piston is urged by said spring toward one end of said cylinder chamber in the axial direction.

3. The valve according to claim 2, wherein said piston is positioned by said spring at a neutral position where said roller supported by said rotating member linked with said piston collapses said tube together with said pressing surface to close the flow passage in said tube, and, when opening the flow passage in said tube and when making said roller move along the flow passage axis of said tube while collapsing said tube with said pressing surface, pressure of a working fluid is utilized to make said piston move from the valve fully closed position and said neutral position.

* * * * *